(12) United States Patent
Bonander

(10) Patent No.: US 10,838,414 B2
(45) Date of Patent: Nov. 17, 2020

(54) METHOD AND SYSTEM FOR AUTOMATIC PARKING OF A VEHICLE

(71) Applicant: VOLVO CAR CORPORATION, Gothenburg (SE)

(72) Inventor: Martin Bonander, Stora Hoga (SE)

(73) Assignee: VOLVO CAR CORPORATION, Gothenburg (SE)

( * ) Notice: Subject to any disclaimer, the term of this patent is extended or adjusted under 35 U.S.C. 154(b) by 176 days.

(21) Appl. No.: 16/015,673

(22) Filed: Jun. 22, 2018

(65) Prior Publication Data

US 2019/0004508 A1   Jan. 3, 2019

(30) Foreign Application Priority Data

Jul. 3, 2017 (EP) ..................... 17179228

(51) Int. Cl.
  *G05D 1/00* (2006.01)
  *B62D 15/02* (2006.01)
  (Continued)

(52) U.S. Cl.
  CPC ........... *G05D 1/0016* (2013.01); *B60W 30/06* (2013.01); *B62D 15/0285* (2013.01);
  (Continued)

(58) Field of Classification Search
  CPC .. E04H 6/225; E04H 6/00; E04H 6/12; E04H 6/422; G06N 7/005; B60T 7/18; B60T 7/22; G07F 7/1008; G07F 17/0014; G07F 7/0866; G06K 7/0008; G06K 17/00; B60R 25/246; G06Q 30/0207; G06Q 20/341;
  (Continued)

(56) References Cited

U.S. PATENT DOCUMENTS

2005/0270178 A1* 12/2005 Ioli ...................... G06Q 50/30
  340/932.2
2010/0283426 A1* 11/2010 Redmann .............. B60L 53/305
  320/109

(Continued)

FOREIGN PATENT DOCUMENTS

DE  102011114317 A1  3/2013
DE  102011086210 A1  5/2013
(Continued)

OTHER PUBLICATIONS

European Patent Office, Extended European Search Report for related Application No. EP17179228 6, dated Dec. 14, 2017, 9 pages.

Primary Examiner — Behrang Badii
(74) Attorney, Agent, or Firm — Brooks Kushman P.C.

(57) ABSTRACT

A method and system are described for automated parking of a vehicle. The method includes determining that the vehicle is in an appropriate starting position for performing a parking maneuver, determining a control zone for controlling the parking maneuver, determining that an authorized key is located in the control zone, detecting an object located in the control zone, verifying that the detected object is an authorized user, detecting a movement of the authorized use, and when the detected movement of the authorized user is a movement in the direction of an expected parking area, performing the parking maneuver.

15 Claims, 7 Drawing Sheets

(51) Int. Cl.
*G05D 1/02* (2020.01)
*B60W 30/06* (2006.01)
*E04H 6/12* (2006.01)
*E04H 6/42* (2006.01)
*G08G 1/00* (2006.01)
*G01C 21/34* (2006.01)
*G01S 19/13* (2010.01)
*E04H 6/22* (2006.01)

(52) U.S. Cl.
CPC ....... *G05D 1/0255* (2013.01); *B60W 2540/00* (2013.01); *E04H 6/12* (2013.01); *E04H 6/225* (2013.01); *E04H 6/422* (2013.01); *G01C 21/34* (2013.01); *G01S 19/13* (2013.01); *G05D 1/0297* (2013.01); *G08G 1/00* (2013.01)

(58) Field of Classification Search
CPC .. G06Q 20/3574; G06Q 20/363; G06Q 40/08; G06Q 30/0217; G05D 1/0016; G05D 1/0088; G05D 1/0278; G05D 1/0061; G05D 1/0055; G05D 1/0255; B62D 15/027; B62D 15/0285; B60W 10/20; B60W 10/18; B60W 30/06; B60W 50/045; B60W 30/09; B60W 50/12; B60W 30/0956; B60W 50/02; B60W 50/0205; B60W 40/09; B60W 50/14; B60W 10/04; B60W 40/08; B60W 2540/00; G07B 15/02; G07B 15/04; G08B 21/0288; G08B 13/1427; G08B 13/1454; G08B 13/1463; G08B 13/2417; G08B 13/2431; G08B 13/2434; G08B 13/2448; G08B 13/2462; G08B 13/2471; G08B 13/2474; G08B 13/2477; G08B 13/2482; G08B 21/0227; G08B 21/0286; G08B 25/10; G07C 9/00309; G07C 5/0808; G07C 5/02; A61B 5/7282; A61B 5/4064; A61B 5/02028; A61B 5/6893; A61B 5/4094; G06F 8/65; G01C 21/3407
See application file for complete search history.

(56) References Cited

U.S. PATENT DOCUMENTS

| | | | | |
|---|---|---|---|---|
| 2012/0130872 | A1* | 5/2012 | Baughman | G08G 1/146 705/32 |
| 2013/0015707 | A1* | 1/2013 | Redmann | B60L 53/305 307/39 |
| 2013/0183123 | A1* | 7/2013 | Meiners | E04H 6/225 414/231 |
| 2013/0282448 | A1* | 10/2013 | Rydbeck | G06Q 20/145 705/13 |
| 2014/0222252 | A1 | 8/2014 | Matters et al. | |
| 2014/0365032 | A1 | 12/2014 | Park et al. | |
| 2015/0073661 | A1 | 3/2015 | Raisch et al. | |
| 2015/0285645 | A1* | 10/2015 | Maise | B62D 15/0285 701/25 |
| 2016/0193996 | A1 | 7/2016 | Stefan | |
| 2017/0129537 | A1 | 5/2017 | Kim | |

FOREIGN PATENT DOCUMENTS

| | | |
|---|---|---|
| DE | 102012022087 A1 | 5/2014 |
| DE | 102013207369 A1 | 10/2014 |
| DE | 102014209115 A1 | 11/2015 |
| DE | 102015208624 A1 | 11/2016 |
| EP | 2821807 A2 | 1/2015 |
| JP | 2004362466 A | 12/2004 |
| JP | 2008174192 A | 7/2008 |
| JP | 2015001778 A | 1/2015 |

* cited by examiner

METHOD AND SYSTEM FOR AUTOMATIC PARKING OF A VEHICLE

CROSS-REFERENCE TO RELATED APPLICATIONS

This application claims foreign priority benefits under 35 U.S.C. § 119(a)-(d) to European patent application number EP 17179228.6, filed Jul. 3, 2017, which is incorporated by reference in its entirety.

TECHNICAL FIELD

The present disclosure relates to automatic parking of a vehicle where an object outside of the vehicle guides a parking maneuver.

BACKGROUND

When maneuvering a vehicle with the driver on the outside, it is the responsibility of the driver to stop the vehicle if a potentially dangerous situation occurs, which is no different from when the driver is sitting in the driver seat. However, an automated system must secure that the vehicle stops if the driver is no longer in the loop, i.e. if the driver is no longer in control of the maneuver.

Present solutions for remotely controlling the maneuvering of vehicles often include a device such as a smartphone, a remote control or both in combination. The purpose of the device is not only to give the driver a stopping mechanism, but also for the system to be able detect that the driver is actively controlling and/or monitoring the vehicle.

However, using a device for remote auto parking raises issues of robustness as well as convenience. The robustness related issues refer to the device as well as the driver holding the device, since human behavior not always can be considered consistent and robust. If the driver is supposed to press a button, or release a button, in an emergency situation, it is not inevitably that such an action is performed if the driver is struck by panic. In comparison, the muscle memory of a driver is trained to press the brake pedal by using it several times every driving cycle, as opposed to an emergency stop button which will not be used in every day driving. Accordingly, a driver cannot be expected to instinctively press or release the button in case of an immediate risk. Moreover, the described systems requiring an "in-the-loop" driver may give a false sense of safety in that the driver may assume that the parking operation is safe as long as e.g. the button is depressed.

In particular, the general trends in the vehicle industry seems to be to move away from remote control devices towards using smartphones as an access/starting key. Thereby, there is also a risk a bad HMI solution. Moreover, the robustness of the control solution can become uncertain if several different types of telephone hardware and operating systems must be supported. Moreover, a smartphone may not function properly if the display gets wet.

An additional problem with using a device such as a smartphone is that sometimes both hands are occupied with e.g. groceries, hence the presently available feature for opening the trunk by sweeping a foot beneath the trunk. However, if the car is parked in such a way that the trunk is not accessible, it will still be needed to put down whatever is being carried, which can be problematic if the ground is wet, or if the driver for medical reasons has a problem picking up items from the ground.

Accordingly, it is a safety critical issue to be able to stop the vehicle during an automatic maneuver, and current solutions all have drawbacks as discussed above. Thereby, it is desirable to provide an improved method for performing an automated parking maneuver.

SUMMARY

In view of above-mentioned and other drawbacks of the prior art, it is an object of the present disclosure to provide an improved method and system for automated parking of a vehicle.

According to a first embodiment of the disclosure, there is provided a method for automated parking of a vehicle. The vehicle comprises a plurality of proximity sensors configured to detect the proximity of an object in the vicinity of the vehicle. The method comprises, in the vehicle: determining that the vehicle is in an appropriate starting position for performing a parking maneuver; determining a control zone for controlling the parking maneuver; determining that an authorization key is located in the control zone; detecting an object located in the control zone; verifying that the detected object is an authorized user; detecting a movement of the authorized user; and if the detected movement of the authorized user is a movement in the direction of an expected parking area, performing the parking maneuver.

The proximity sensors of the vehicle may for example be ultrasound sensors of the same type used for parking sensors. Such sensors are capable of detecting objects in the range of a few meters around the vehicle, defining a near-field sensing zone. However, it would also be possible to use other sensors such as IR- or laser-based sensing systems, alone or in combination with the aforementioned ultrasound sensors. The proximity sensors are not only capable of determining if there is an object in the vicinity of the vehicle, they can also determine the location of such an object with sufficient accuracy. Moreover, the proximity sensor system of the present disclosure may be capable of detecting objects in a 360° area around the vehicle.

The described method for automated parking is initiated by a parking command which may be issued by a remote device located outside of the vehicle or it may be initiated by issuing a command from within the vehicle using a control panel of the vehicle or the like. The parking command may for example be issued by the authorized key.

Once the parking command is issued, the method for performing the parking maneuver is initiated by determining that the vehicle is in an appropriate starting position. The appropriate starting position of the vehicle may be a position where the vehicle has an unobstructed path to the parking area and where no vehicles or other objects are in a projected path of the vehicle. Accordingly, the vehicle should have identified the parking area prior to commencing the parking maneuver. The parking area may be automatically identified by the vehicle, or the parking area may be defined in a remote device and provided to the vehicle, for example along with the command to perform the parking maneuver. Moreover, the parking maneuver may be either a park-in or a park-out maneuver. For a park-in maneuver, the parking area is typically a parking space, whereas for a park-out maneuver, the parking area may be an area where the driver conveniently can enter the vehicle and drive away from the parking area.

In the present context, the control zone defines the area where the user is expected and allowed to move during a parking maneuver thereby controlling the parking maneuver. Moreover, both the authorized key and the authorized user need to be in the control zone in order to initiate the parking maneuver. A maneuver zone of the vehicle can be described as the area where the vehicle is expected to move during the parking maneuver. The expected maneuver zone may be defined with a certain degree of safety margin such that the maneuver zone is larger than the actual area needed for performing the parking maneuver. The parking area is the area which the vehicle will move into and subsequently occupy when the parking maneuver is completed.

The vehicle can be assumed to have a nearfield sensing zone which includes both the control zone and the parking area. In most circumstances, the nearfield sensing zone as defined based on the vehicle location when starting the parking maneuver also includes the maneuver zone. The nearfield sensing zone is in practice defined and limited by the range of a proximity sensing system of the vehicle.

The authorized key is identified and verified prior to the parking sequence begins. This may be done using known methods of communication and verification between a vehicle and a remote key, for example using RF communication. Moreover, the authorized key may be a key fob, a smartphone or any other electronic device capable of and suitable for communicating with the vehicle.

By both determining that the authorized key is located in the control zone and by detecting an object and verifying that the object is an authorized user, the vehicle is authorized to perform the parking maneuver. The authorized user may be the driver of the vehicle. However, it is also possible that the authorized user is a parking robot or a device used in an automated parking system. The described steps can be seen as "picking up the leash" where the driver picks up the vehicle to lead the vehicle into the parking area.

Once the authorized user is verified, the vehicle tracks the movement of the authorized user and performs the parking maneuver according to the movements of the authorized user.

The present disclosure is based on the realization that by using a near field proximity sensing system in combination with the authorized key, the vehicle can be automatically parked in a secure, safe and convenient manner with the driver on the outside. Thereby, the safety, performance and convenience in remote controlled automated parking is increased.

Moreover, once authorization of the user is achieved, no further communication between the user and the vehicle is required. This increases the safety of the automated parking procedure since the driver is properly "in the loop", and not just assumed to be in-the-loop based on an input from an external device.

According to one embodiment of the disclosure, verifying that the detected object is an authorized user may comprise determining that the object is the only object, besides the authorized key, located in the control zone. The object may be detected using the proximity sensors, and if only one object is identified in the control zone and it has been established that the authorized key is also located in the control zone, the assumption can be made that the detected object is also the authorized user.

According to one embodiment of the disclosure, the method may further comprise stopping the parking maneuver if the authorized user leaves the control zone. The proximity sensor system tracks the movement of the authorized user to ensure that the user is in-the-loop and monitors the parking maneuver. Accordingly, if the authorized user leaves the control zone, or if the tracking of the movement of the authorized user is otherwise lost, the vehicle is stopped to avoid unmonitored movement of the vehicle.

Stopping the parking maneuver may comprise halting the parking maneuver with the option to later resume the maneuver if certain conditions are fulfilled. Stopping the parking maneuver may also comprise cancelling/aborting the maneuver where a new parking maneuver must be initiated from the start. It can be selected whether the parking maneuver should be aborted or merely halted for example based on the reason for stopping the parking maneuver.

According to one embodiment of the disclosure, the method may further comprise, when performing the parking maneuver: determining a velocity of the authorized user, and if a difference between the velocity of the authorized user and the velocity of the vehicle is larger than a predetermined threshold value, stopping the parking maneuver. The difference in velocity may for example exceed the threshold value if the authorized user stops, in which case the vehicle will also stop. The difference in velocity may also be a result of the vehicle moving too fast, which may be an indication of a vehicle malfunction, thereby leading to that the vehicle stops.

According to one embodiment of the disclosure, the method may further comprise, when performing the parking maneuver: determining a movement direction of authorized user, and if the authorized user moves away from the vehicle, stopping the parking maneuver. Thereby, if the authorized user moves away from the vehicle, it can be assumed that the authorized user no longer actively monitors the parking maneuver, which is subsequently stopped.

According to one embodiment of the disclosure, the method may further comprise, when performing the parking maneuver: determining a movement direction of authorized user; determining a range of allowable movement directions for the authorized user based on the control zone, and if the authorized user moves in a direction not included in the allowable moving directions, stopping the parking maneuver. The authorized user is typically supposed to move in the direction of the parking area. However some discrepancy in the direction of the direction of movement may be allowable and the allowable movement directions may for example be defined by a conical area, within the control zone, pointing in the direction of the parking area.

According to one embodiment of the disclosure, the method may further comprise, if the parking maneuver has been stopped: determining a movement of the authorized user; and if the determined movement of the authorized user is a movement in the direction of an expected parking area, performing the parking maneuver. The parking maneuver may be stopped for a range of different reasons. If the parking maneuver has been stopped because the authorized driver is not moving or is moving in an unexpected direction, the parking maneuver may simply be resumed if the authorized user once again starts to move in an allowable direction. However, for some instances, the user needs to be re-authorized to resume the parking maneuver, for example if the authorized user has left the expected maneuver zone.

According to one embodiment of the disclosure, the method may further comprise, for a stop zone defined as a zone surrounding the vehicle, detecting a moving object in the stop zone which is not the authorized user and stopping the parking maneuver. The stop zone thereby defines a safety area around the vehicle in which no other moving objects except the authorized user is allowed. Thereby, any accidents can be avoided if a person, vehicle or any other detectable objects enters the maneuver zone. A moving object in the stop zone may also result in that the tracking of the movement of the authorized user is erroneous or lost, in which case the parking maneuver is stopped as a safety precaution.

According to one embodiment of the disclosure, the method may further comprise, during the parking maneuver: tracking the location of the authorized user in the control zone, and if the location of the authorized user can no longer be determined, stopping the parking maneuver. Thereby, if for any reason the location of the authorized user cannot be established, the parking maneuver is stopped. It should be noted that in all instances when the parking maneuver is stopped, the parking maneuver may be aborted such that a new parking command must be issued before performing a new parking maneuver. It is also possible to determine if the stopped parking maneuver can be resumed based on the reason for stopping.

According to one embodiment of the disclosure, verifying that the object is an authorized user may further comprise verifying that that a location of the authorized key is the same as a location of the object. This requires that the location of the authorized key, in the control zone, can be determined independently of the location of the detected object. The location of the authorized key may for example be performed using known time-of-arrival or time-difference-of arrival measuring schemes, assuming that both the vehicle and the key have the required capabilities. Meanwhile, the location of the object can still be determined using the proximity sensing system. By ensuring that the location of the authorized key is the same as the location of the object, the object can be verified as an authorized user with a higher degree of certainty.

According to one embodiment of the disclosure, a park-in maneuver may comprise: detecting a movement of the authorized user alongside the vehicle in the direction of the parking area; moving the vehicle the towards the parking area; detecting that the authorized user has stopped; detecting that the authorized user is located on a side of the vehicle such that the vehicle is between the user and the parking area; detecting a movement of the authorized user towards the vehicle in the direction of the parking area; and moving the vehicle into the parking area.

According to one embodiment of the disclosure a park-out maneuver may comprise: detecting that the authorized user is located in the control zone; provide an indication to the authorized user that the authorized user can start moving; detecting that the authorized user moves in a direction away from the vehicle; and moving the vehicle along a predetermined trajectory. The predetermined trajectory may be a trajectory determined by the vehicle based on knowledge of the vehicle surroundings or it may be a trajectory which is provided to the vehicle by a driver or by an automated parking system.

According to a second embodiment of the disclosure, there is provided an automated parking system in a vehicle. The system comprises: a plurality of proximity sensors configured to detect the proximity of an object in the vicinity of the vehicle; a transceiver configured to communicate with an authorization key located outside of the vehicle; and a parking control unit configured to: determine that the vehicle is in an appropriate starting position for performing a parking maneuver; determine a control zone for performing the parking maneuver; determine the that an authorized key is located in the control zone; detect an object located in the control zone; verify that the object is an authorized user; detect a movement of the authorized user; and if the detected movement of the authorized user is a movement in the direction of an expected parking area, control the vehicle to perform the parking maneuver.

According to one embodiment of the disclosure the proximity sensors may advantageously be ultrasound sensors.

According to one embodiment of the disclosure, the authorized key may advantageously be an interactive electronic device configured to communicate with the vehicle. The authorized key may for example be a smartphone comprising an app used to issue a parking command and to control other features of the vehicle.

Additional effects and features of the second embodiment of the disclosure are largely analogous to those described above in connection with the first embodiment of the disclosure.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

The present disclosure will now be described in more detail, with reference to the appended drawings showing exemplary embodiments of the disclosure, wherein.

DETAILED DESCRIPTION

As required, detailed embodiments are disclosed herein. However, it is to be understood that the disclosed embodiments are merely exemplary and that various alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the present detailed description, various embodiments of the system and method according to the present disclosure are mainly described with reference to a method and system where the authorized user is a person which is also the driver of the vehicle. However, it is equally possible that the authorized user is a robot or another automated feature which acts to guide the vehicle during the parking maneuver.

Figure 1:
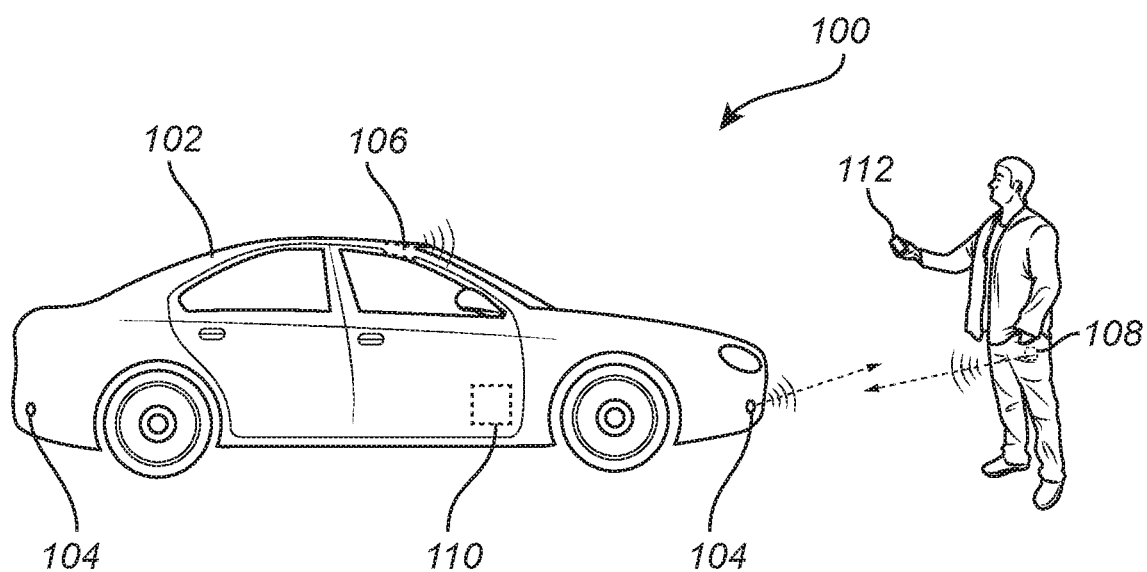
FIG. 1 schematically illustrates an automated parking system according to an exemplary embodiment of the disclosure.

FIG. 1 schematically illustrates an automated parking system 100 in a vehicle 102 according to an embodiment of the disclosure. The system 100 comprises a plurality of proximity sensors 104 arranged in the vehicle 102. The proximity sensors 104 are configured to detect the proximity of an object in the vicinity of the vehicle 102. The proximity sensors 104 may for example be ultrasound transducers capable of transmitting and receiving ultrasound signals, and to detect the proximity or location of an object being within the range of the sensors 104. In particular, the proximity sensors 104 are capable of accurately determining the location of an object if at least two different proximity sensors 104 can transmit a signal towards and receive a corresponding reflected signal from the object. Such a sensor configuration can for example be achieved by arranging one proximity sensor 104 in each corner of the vehicle, where the coverage of the sensor in the ground plane is 270°. It is of course also possible to achieve the same effect using a larger number of proximity sensors 104 arranged in the vehicle.

The system 100 further comprises a radio transceiver 106, such as a Bluetooth device and/or an RF transceiver, arranged in the vehicle 102 and configured to communicate with an authorization key 108 located outside of the vehicle 102, and the vehicle also comprises a parking control unit 110. Authorization of a key 108 may thereby be performed using e.g. RF communication based on known methods, where a broadcast from the vehicle 102 can be used to discover the key 108.

The parking control unit 110 of the vehicle 102 is configured to control the vehicle 102 and the communication between the vehicle 102 and the user device 108 in order to perform the steps of the method for automated parking described in the following.

The parking control unit 110 may include a microprocessor, microcontroller, programmable digital signal processor or another programmable device. The control unit 110 may also, or instead, include an application specific integrated circuit, a programmable gate array or programmable array logic, a programmable logic device, or a digital signal processor. Where the control unit 110 includes a programmable device such as the microprocessor, microcontroller or programmable digital signal processor mentioned above, the processor may further include computer executable code that controls operation of the programmable device, that controls the various features and/or components described herein, that provides for or controls interaction and/or cooperation between the various features and/or components described herein, and/or that controls or performs the particular algorithms represented by the various functions and/or operations described herein. Moreover, the parking control unit 110 may be a general purpose control unit of the vehicle 102, or it may be a dedicated control unit 110 specifically configured to control the automated parking system 100.

It should also be noted that a parking maneuver according to various embodiments of the disclosure typically is initiated by a driver of the vehicle 102. The driver may for example issue a parking command using an interface in the vehicle 102, or by using a smartphone 112 or the like. Thereby, the parking maneuver can be initiated both from within the vehicle 102 as well as from outside of the vehicle 102. Moreover, it is typically required that the vehicle 102 has recognized the presence of an authorized key, or received authorization in any other way, before any commands are accepted by the vehicle 102.

Figure 2:
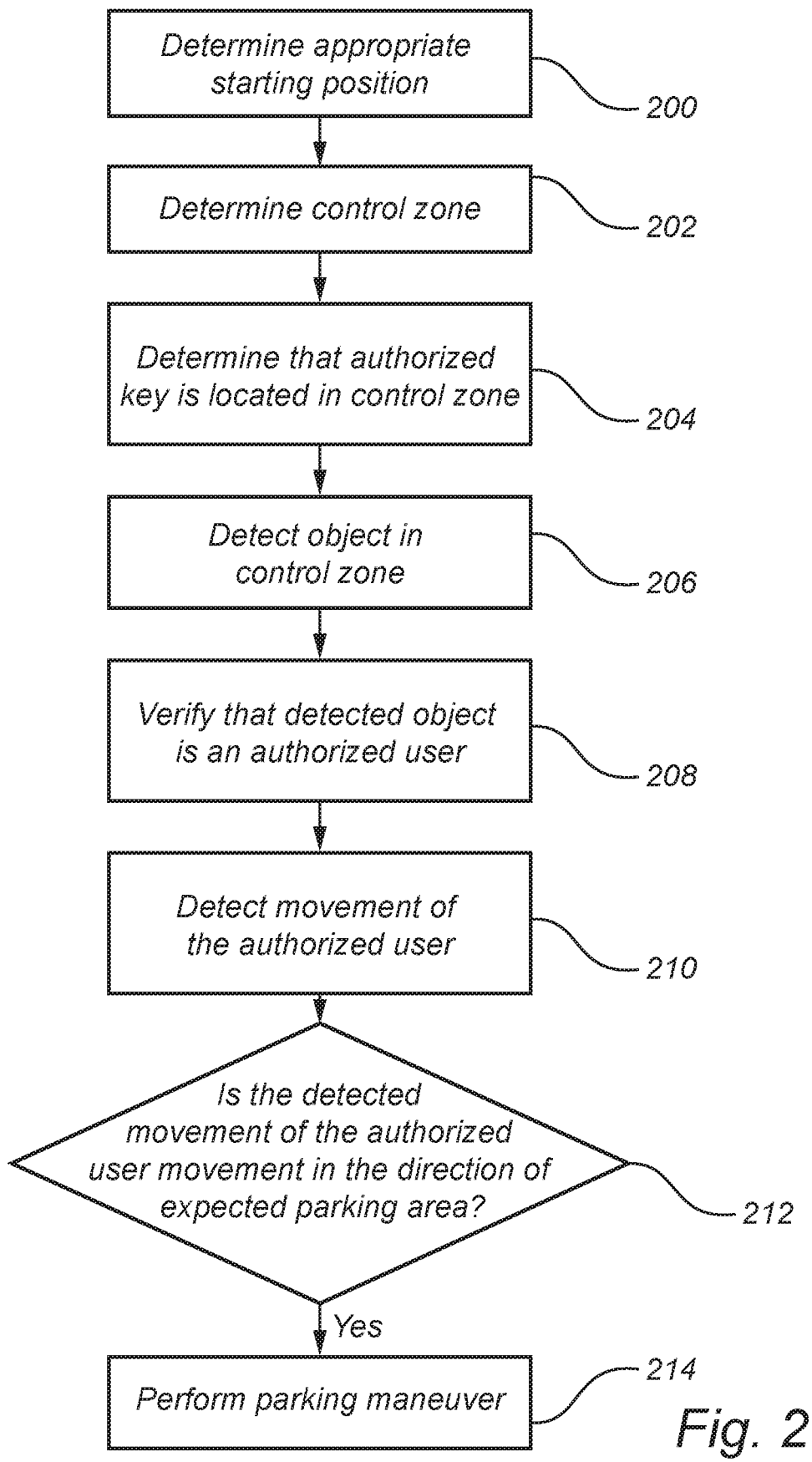
FIG. 2 is a flow chart outlining the general steps of a method according to an exemplary embodiment of the disclosure.
Figure 3:
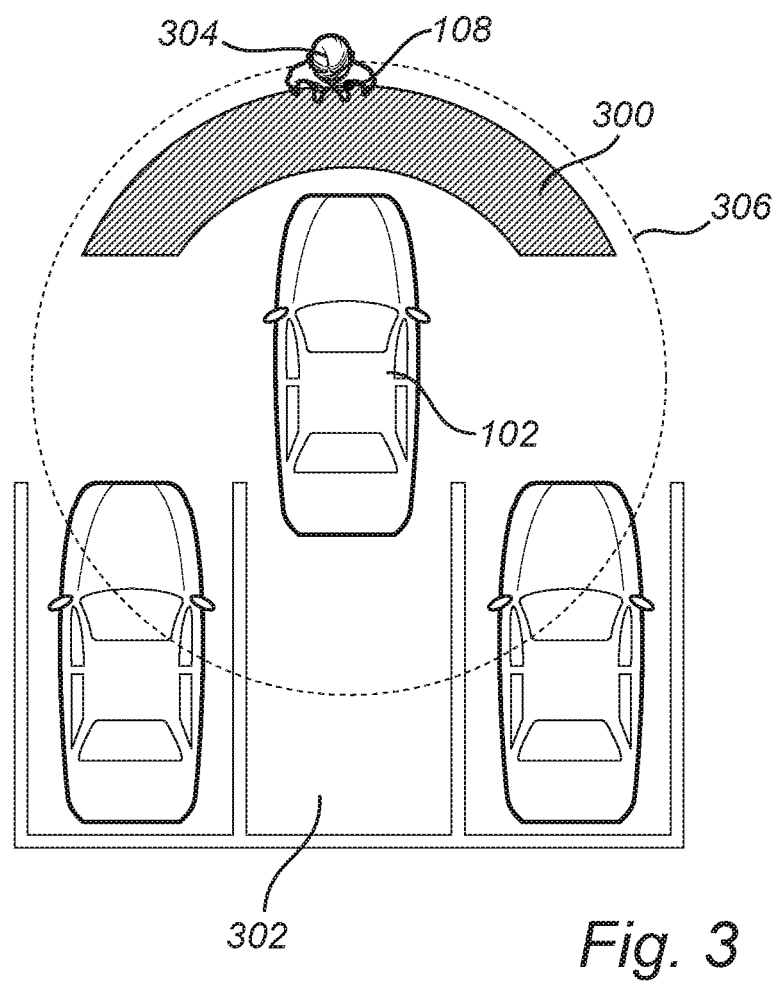
FIG. 3 schematically illustrates features of an automated parking system according to an exemplary embodiment of the disclosure.

FIG. 2 is a flow chart illustrating the general steps of a method according to an embodiment of the disclosure. The method outlined by FIG. 2 will be discussed with further reference to FIG. 3 schematically illustrating a vehicle 102 in a parking lot ready to perform park-in maneuver according to an embodiment of the disclosure. Here, the park-in command may have been issued using an app in a smartphone 112 after the driver has left the vehicle 102.

Accordingly, once the parking command has been issued, the method comprises determining 200 that the vehicle 102 is in an appropriate starting position for performing a parking maneuver. Such a determination can for example be made using the proximity sensors 104 to ascertain that there is a free and unobstructed path to the intended parking area 302.

Next, a control zone 300 for controlling the parking maneuver is determined 202. The control zone 300 is the zone where the authorized user is allowed to move during the parking maneuver to guide and thereby control the vehicle 102 during parking maneuver. The control zone 300 may be defined in relation to the vehicle 102 such that the control zone 300 moves along with the vehicle 102. For a park-in maneuver where the vehicle 102 is positioned with the rear end towards the parking area 302, the control zone 300 may comprise a semi-circular area in front of the vehicle 102 as illustrated in FIG. 3. Accordingly, the control zone 300 may exclude an area where the vehicle 102 is anticipated to travel during the parking maneuver.

The following steps of the method comprises determining 204 that an authorized key 108 is located in the control zone 300, detecting 206 an object located in the control zone 300 and verifying 208 that the object detected in the control zone 300 is an authorized user 306. Accordingly, the location of the authorized key 108 may be determined for example using an RF communication channel previously established between the key 108 and the vehicle 102 in combination with the proximity sensing system of the vehicle. The determined location of the authorized key 108 is then matched with the control zone 300 to verify that the key 108 is within the control zone 300. However, since the control zone 300 typically has a certain extension, it is not required that the location of the key 108 is precisely determined. It is sufficient that it can be verified that the key 108 is in the correct area. The next step, comprising detecting 206 an object in the control zone 300, can also be performed using the proximity sensing system. Next, the method involves verifying that the detected object is an authorized user. If only one object is detected in the control zone 300, and if the location of the key 108 is within the control zone 300, the detected object can be defined as an authorized user 304. If a system is available where a more accurate positioning of the key is possible, verification 208 may comprise determining that the location of the key 108 is the same as the location of the detected object.

The next step comprises detecting 210 a movement of the authorized user 304 and if 212 the detected movement of the authorized user 304 is a movement in the direction of an expected parking area 302, performing 214 the parking maneuver. To complete the parking maneuver, the authorized user 304 may be required to move along with the movement of the vehicle to thereby stay within the control zone 300 which has a fixed position in relation to the vehicle 102.

There are several events which may cause the vehicle 102 to stop the parking maneuver. The parking maneuver may for example be stopped if the user 304 leaves the control zone 300, which may occur if the user 304 stands still or moves too slowly as the vehicle 102 moves, thereby effectively resulting in the control zone 300 being moved away from the location of the user 304. The parking maneuver may also be stopped if a difference in velocity between the vehicle 102 and the user 304 is above a predetermined threshold value. An example velocity of the vehicle 102 during a parking maneuver may be 4 km/h. Assuming that the predetermined threshold value for the difference in velocity is 2 km/h, the user 304 should move with a speed of at least 2 km/h, but not faster than 6 km/h, in the same direction that the vehicle 102 is moving. Accordingly, the parking maneuver may be stopped even if the user 304 has not left the control zone 300. A parking maneuver which has been stopped as a result of an exceeded difference in velocity may be resumed again if the user 304 again begins to move in the correct direction. However, for a user 304 leaving the control zone 300, the parking maneuver may need to be re-initialized to ensure that an object in the control zone 300 is an authorized user 304.

Another reason for stopping the parking maneuver may be that a moving object, which is not the user 304, is detected in a stop zone 306 surrounding the vehicle 102. The stop zone 306 may for example be a circular area centered on the vehicle 102 as illustrated in FIG. 3. The moving object may present a collision risk for the vehicle 102, i.e. the moving object may be another vehicle entering the stop zone. The moving object may also be another person entering the stop zone 306 in which case the parking maneuver is stopped for safety reasons. A moving object entering the stop zone 306 may also result in that the tracking of the user 304 movement is lost, thereby necessitating a stop of the parking maneuver.

FIGS. 4A-D schematically illustrate the general steps of a park-in maneuver according to an embodiment of the disclosure. Here, the driver has positioned the vehicle 102 at the edge of the parking area 302, and automated parking may be desirable due to the width of the parking area 302 and the proximity of adjacent vehicles. It is assumed that the park-in command is issued by the driver, either using an in-vehicle interface or by means of an app on a smartphone or the like.

Figure 4A:
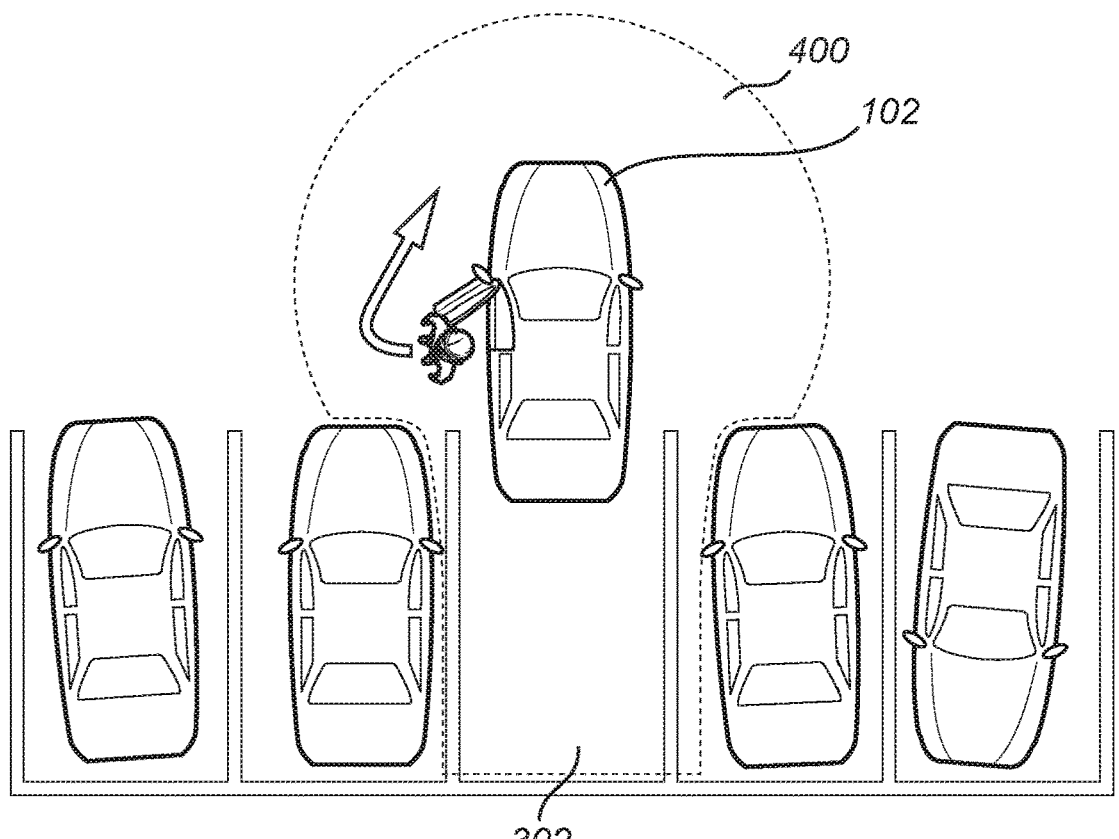
FIGS. 4A-D schematically illustrate a parking maneuver according to an exemplary embodiment of the disclosure.

FIG. 4A illustrates the driver leaving the vehicle 102. The vehicle 102 has a nearfield sensing zone 400 surrounding the vehicle 102, defined by the range of the proximity sensor system of the vehicle 102. It is assumed that a key should be within the near field sensing zone 400 to be authorized.

Figure 4B:
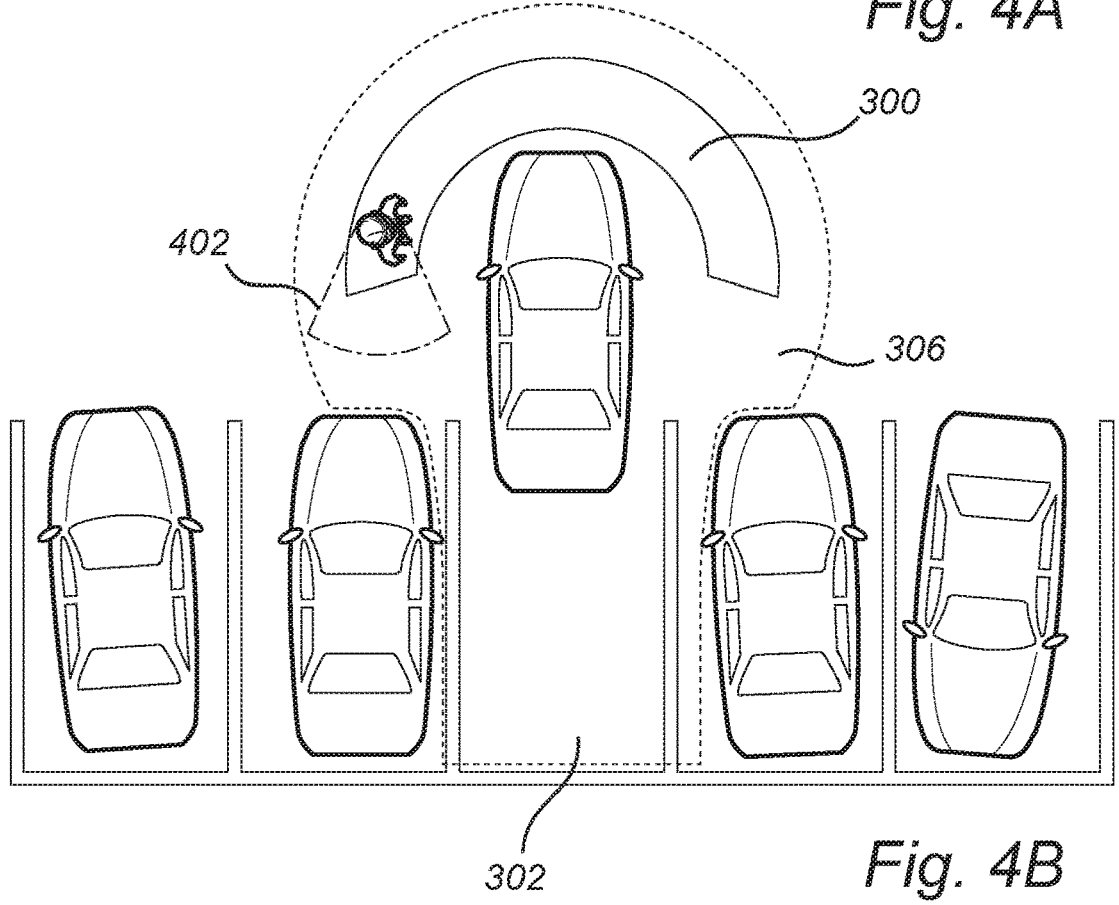

In FIG. 4B, the driver has moved into position in the control zone 300 and is there verified as an authorized user 304. Moreover, the vehicle 102 has defined a stop zone 306 surrounding the vehicle 102 and also extending to cover the parking area 302 to ensure that the parking area 302 remains clear during the parking maneuver. The stop zone 306 may for example be defined as the nearfield sensing zone 400 excluding the control zone 300, or as the nearfield sensing zone 400 excluding only an area corresponding to the location of the authorized user 304. Once the user 304 is authorized and in position, the vehicle 102 can indicate that it is ready to start the parking maneuver. Such an indication may comprise a light or sound signal or a combination thereof. An indication that the vehicle 102 is ready may also comprise moving the vehicle 102 a very short distance in the direction of the parking area 302 and then stopping again. FIG. 4B further illustrates allowable walking directions of the user 304 as conical area 402 which the user 304 should adhere to in order to start and continue the parking maneuver.

Figure 4C:
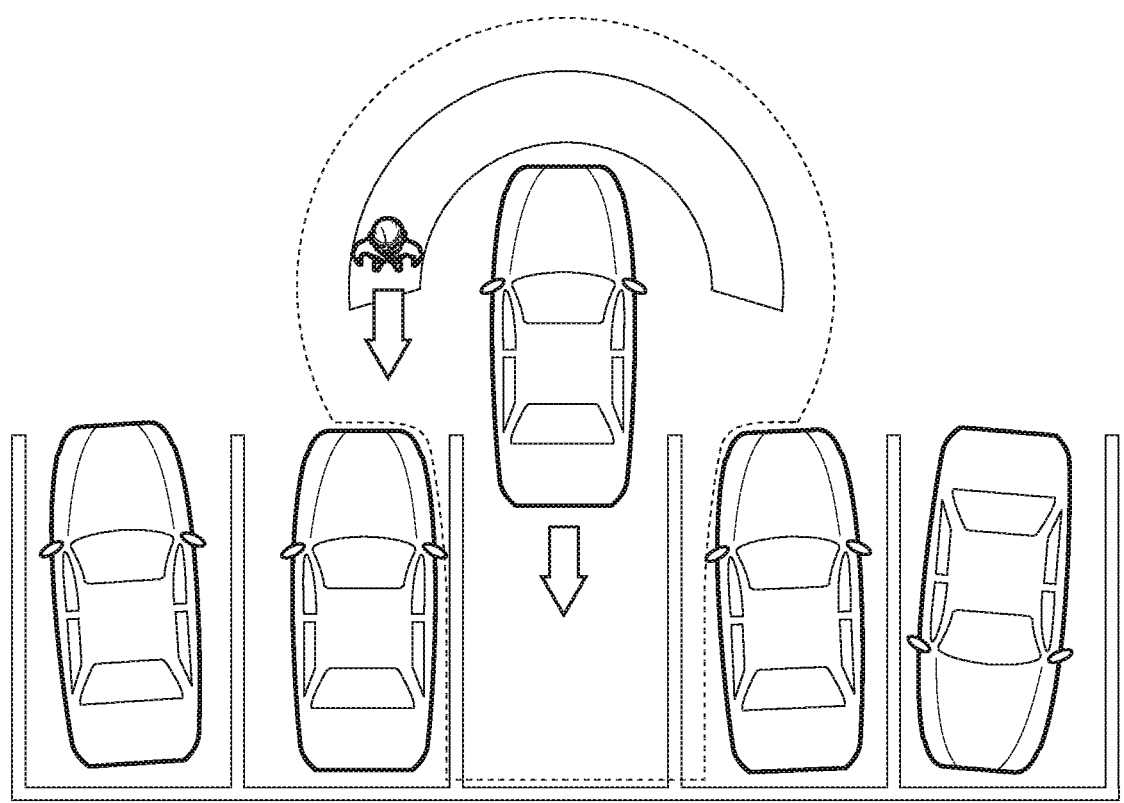

Once both the vehicle 102 and user 304 are ready, the user 304 may begin to move in the direction of the parking area as indicated in FIG. 4C. The user 304 may then be positioned adjacent to the vehicle 102 to avoid the more exposed position in front of the vehicle 102.

Figure 4D:
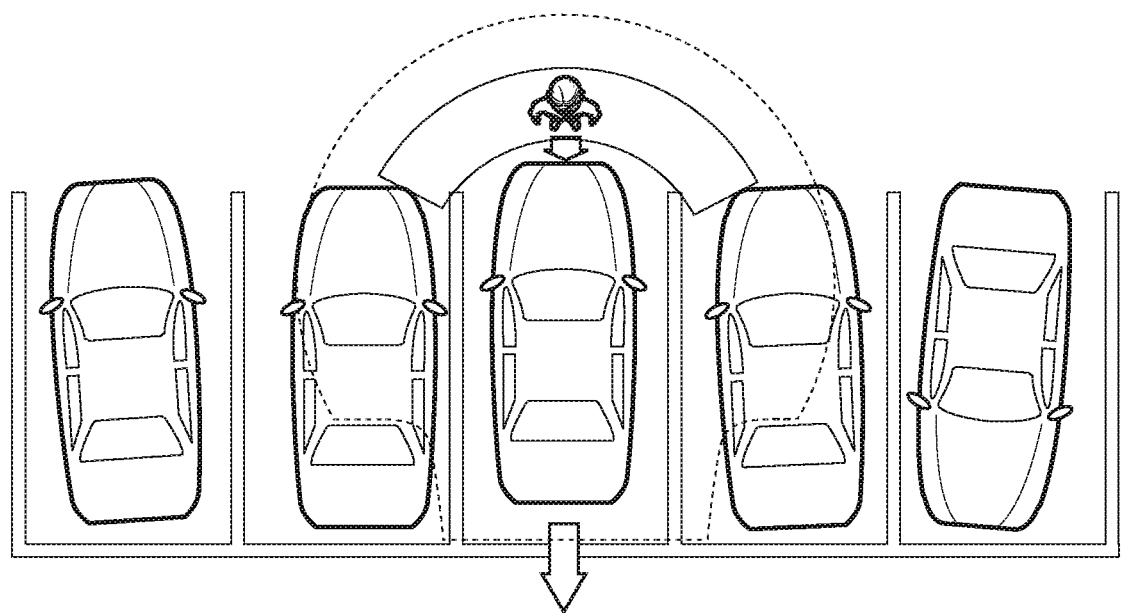

As illustrated in FIG. 4D, the vehicle 102 has nearly reached the intended parking area 302. However, it is no longer convenient for the user 304 to move alongside the vehicle 102. Accordingly, the vehicle 102 detects that the user 304 has stopped. Next, the user may move to the front of the vehicle 102 and finalize the parking by moving towards the vehicle 102. The vehicle 102 thereby detects that the user 304 is located on a side of the vehicle 102 such that the vehicle 102 is located between the user 304 and the parking area 304 and once a movement of the user 304 towards the vehicle 102 in the direction of the parking area 302 is detected the vehicle 102 can move into the parking area 302.

Thereby, the user 304 does not need to leave the control zone 300 during the parking maneuver. The trajectory of the vehicle 102 from the starting position may be predefined as a straight line, meaning that the vehicle 102 does not have to respond to sideways movements of the user 304. It is also feasible with other vehicle trajectories. The trajectory may also be manually input on e.g. a smartphone by the driver, or the driver may be prompted to select from a number of predefined trajectories suggested by the vehicle 102 and presented on the smartphone 112 or on a graphical user interface in the vehicle 102. Moreover, the trajectory may be limited, for example to one vehicle length.

FIGS. 5A-D schematically illustrate the general steps of a park-out maneuver according to an embodiment of the disclosure.

Figure 5A:
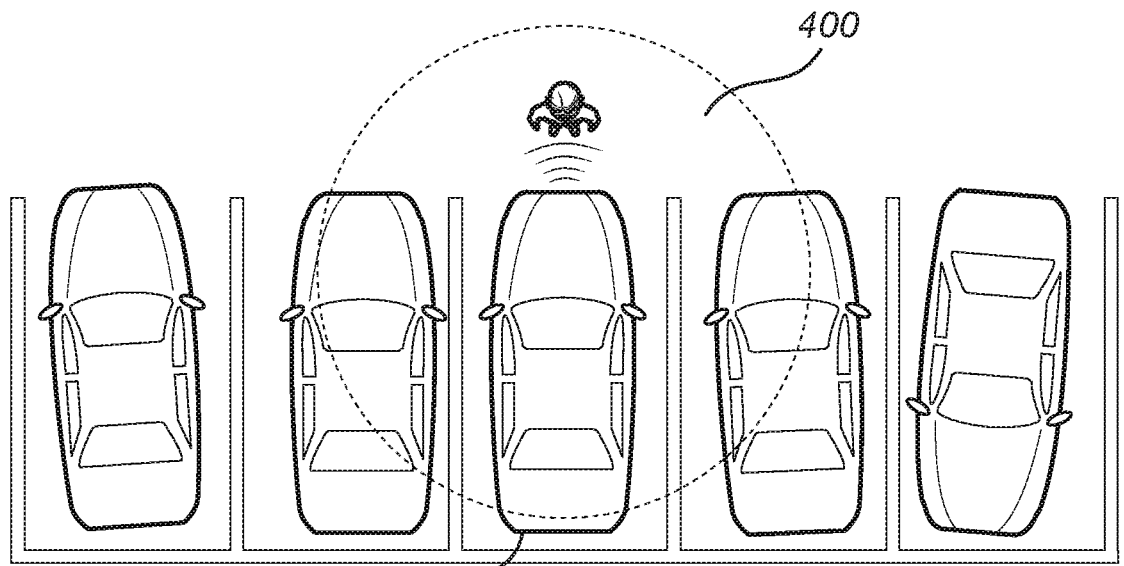
FIGS. 5A-D schematically illustrate a parking maneuver according to an exemplary embodiment of the disclosure.

In FIG. 5A, the driver is standing at the vehicle 102 and issues a park-out command for example using an interface on a smartphone. A key 108 of the driver may be authenticated as soon as the key 108 is with a nearfield sensing zone 400 of the vehicle 102.

Figure 5B:
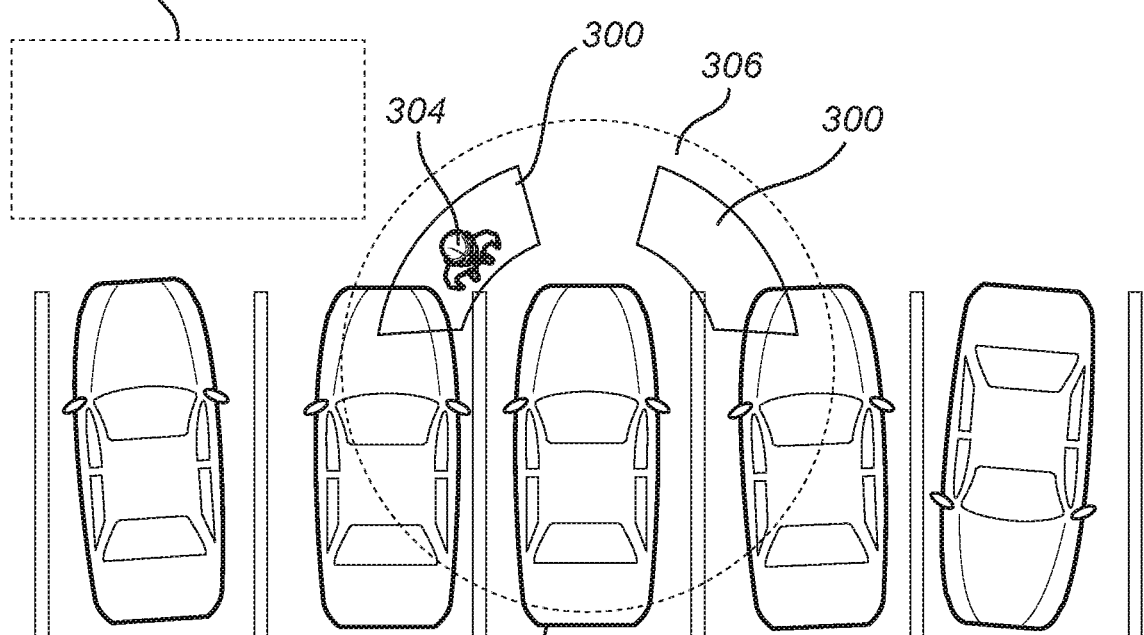

FIG. 5B illustrates that the control zone 300 has been established. The driver is subsequently verified as an authorized user 304 and the vehicle 102 indicates that it is ready to start the parking maneuver. As further illustrated in FIG. 5B, for a park-out maneuver, the parking area 302 is not a parking space but instead a location outside of the parking space where the vehicle 102 can be entered safely and conveniently by the user 304. Accordingly, the parking area 302 is to be interpreted as the intended final destination for the vehicle 102 after performing a park-in or park-out maneuver.

Figure 5C:
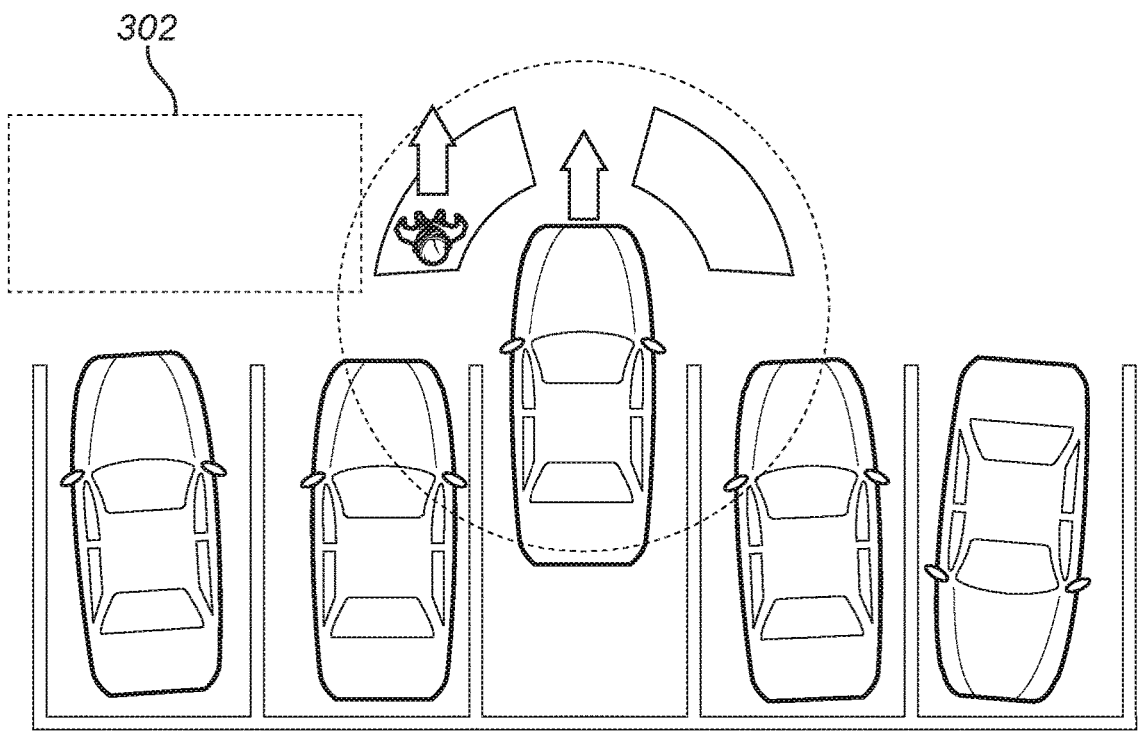

In FIG. 5C, the user 304 starts to move away from the vehicle 102 out of the parking space and the vehicle 102 follows the user 304. In practice, as discussed above, the vehicle 102 may follow a predetermined trajectory instead of the specific movements of the user 304. In the present example, the predetermined trajectory involves turning the vehicle 90°. However, a wide range of different trajectories are possible.

Figure 5D:
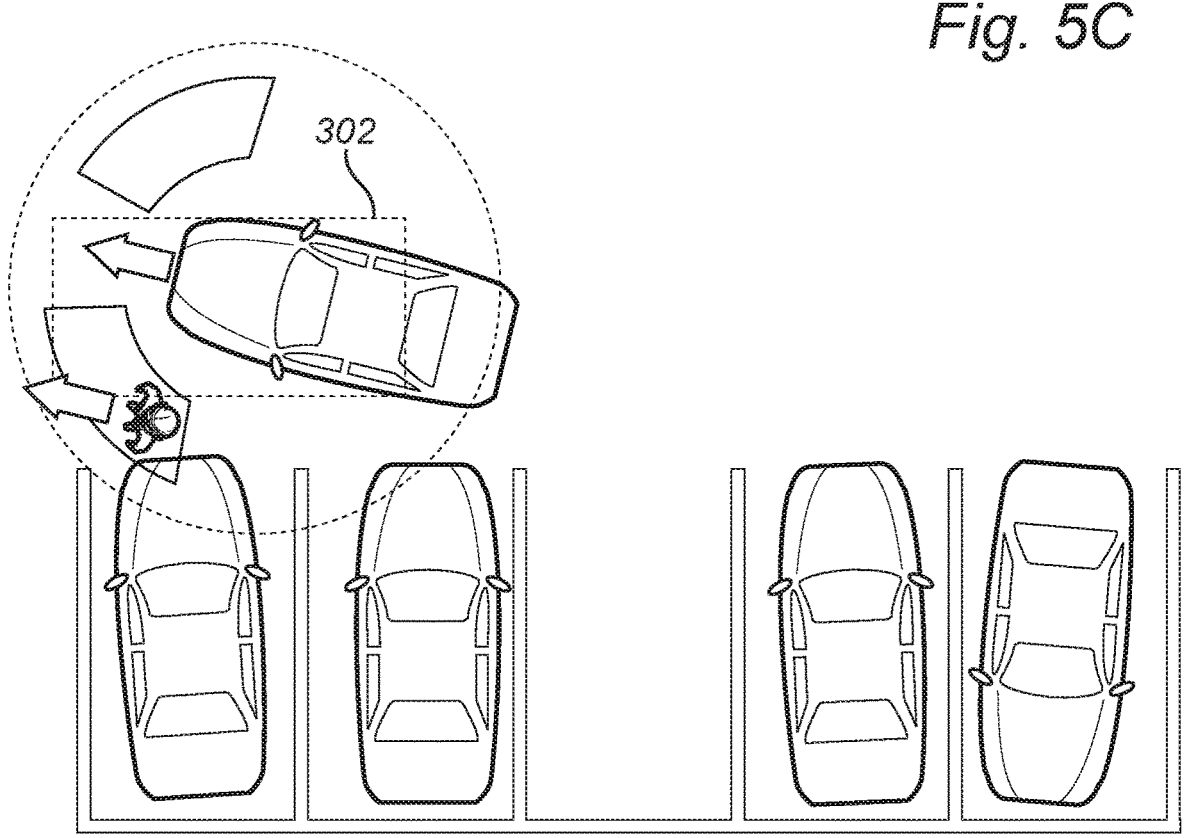

Finally, as illustrated in FIG. 5D, the vehicle 102 reaches the parking area 302 and finalizes the park-out maneuver. The driver can then enter the vehicle 102.

Even though the disclosure has been described with reference to specific exemplifying embodiments thereof, many different alterations, modifications and the like will become apparent for those skilled in the art. Also, it should be noted that parts of the method and system may be omitted, interchanged or arranged in various ways, the method and system yet being able to perform the functionality of the present disclosure.

Additionally, variations to the disclosed embodiments can be understood and effected by the skilled person in practicing the claimed disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for automated parking of a vehicle, the vehicle comprising a plurality of proximity sensors configured to detect a proximity of an object in a vicinity of the vehicle, the method comprising, in the vehicle:
   determining that the vehicle is in an appropriate starting position for performing a parking maneuver;
   determining a control zone for controlling the parking maneuver;
   determining that an authorized key is located in the control zone;
   detecting an object located in the control zone;
   verifying that the detected object is an authorized user;
   detecting a movement of the authorized user; and
   when the detected movement of the authorized user is a movement in a direction of an expected parking area, performing the parking maneuver.

2. The method according to claim 1 wherein verifying that the object is an authorized user comprises determining that only the object, in addition to the authorized key, is located in the control zone.

3. The method according to claim 1 further comprising stopping the parking maneuver when it is detected that the authorized user leaves the control zone.

4. The method according to claim 1 further comprising, when performing the parking maneuver:
   determining a velocity of the authorized user; and
   when a difference between the velocity of the authorized user and a velocity of the vehicle is larger than a predetermined threshold value, stopping the parking maneuver.

5. The method according to claim 1 further comprising, when performing the parking maneuver:
   determining a movement direction of the authorized user; and
   when the authorized user moves away from the vehicle, stopping the parking maneuver.

6. The method according to claim 1 further comprising, when performing the parking maneuver:
   determining a movement direction of the authorized user;
   determining a range of allowable movement directions for the authorized user based on the control zone; and
   when the authorized user moves in a direction not included in the range of allowable movement directions, stopping the parking maneuver.

7. The method according to claim 4 further comprising, when the parking maneuver has been stopped:
   determining a movement of the authorized user; and
   when the determined movement of the authorized user is a movement in the direction of an expected parking area, performing the parking maneuver.

8. The method according to claim 1 further comprising, for a stop zone defined as a zone surrounding the vehicle, detecting a moving object in the stop zone which is not the authorized user and stopping the parking maneuver.

9. The method according to claim 1 further comprising, during the parking maneuver:
   tracking a location of the authorized user in the control zone; and
   when the location of the authorized user can no longer be determined, stopping the parking maneuver.

10. The method according to claim 1 wherein verifying that the object is an authorized user further comprises verifying that a location of the authorized key is the same as a location of the object.

11. The method according to claim 1 wherein a park-in maneuver comprises:
    detecting a movement of the authorized user alongside the vehicle in the direction of the expected parking area;
    moving the vehicle the towards the expected parking area;
    detecting that the authorized user has stopped;
    detecting that the authorized user is located on a side of the vehicle such that the vehicle is between the user and the expected parking area;
    detecting a movement of the authorized user towards the vehicle in the direction of the expected parking area; and
    moving the vehicle into the expected parking area.

12. The method according to claim 1 wherein a park-out maneuver comprises:
    detecting that the authorized user is located in the control zone;
    providing an indication to the authorized user that the authorized user can start moving;
    detecting that the authorized user moves in a direction away from the vehicle; and
    moving the vehicle along a predetermined trajectory.

13. An automated parking system for a vehicle, the system comprising:
    a plurality of proximity sensors configured to be mounted in a vehicle and to detect a proximity of an object in a vicinity of the vehicle;
    a transceiver configured to communicate with an authorized key located outside of the vehicle; and
    a parking control unit configured to communicate with the proximity sensors and the transceiver, the parking control unit configured to
       determine that the vehicle is in an appropriate starting position for performing a parking maneuver,
       determine a control zone for controlling the parking maneuver,
       determine that an authorized key is located in the control zone,
       detect an object located in the control zone,
       verify that the object is an authorized user,
       detect a movement of the authorized user, and
       when the detected movement of the authorized user is a movement in a direction of an expected parking area, control the vehicle to perform the parking maneuver.

14. The system according to claim 13 wherein the proximity sensors are ultrasound sensors.

15. The system according to claim 13 wherein the authorized key is an interactive electronic device configured to communicate with the vehicle.

* * * * *